US012198919B2

(12) United States Patent
Ugarov

(10) Patent No.: US 12,198,919 B2
(45) Date of Patent: Jan. 14, 2025

(54) ION GUIDE GEOMETRY IMPROVEMENTS

(71) Applicant: Thermo Finnigan LLC, San Jose, CA (US)

(72) Inventor: Mikhail V. Ugarov, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 383 days.

(21) Appl. No.: 17/705,177

(22) Filed: Mar. 25, 2022

(65) Prior Publication Data

US 2023/0307221 A1 Sep. 28, 2023

(51) Int. Cl.
*H01J 49/06* (2006.01)
*H01J 49/00* (2006.01)

(52) U.S. Cl.
CPC ........ *H01J 49/063* (2013.01); *H01J 49/0031* (2013.01)

(58) Field of Classification Search
CPC .... H01J 49/063; H01J 49/0031; H01J 49/421; H01J 49/4215; H01J 49/4255
See application file for complete search history.

(56) References Cited

U.S. PATENT DOCUMENTS 5,763,878 A 6/1998 Franzen
5,847,386 A 12/1998 Thomson et al.
2005/0067564 A1 3/2005 Douglas et al.
2006/0027745 A1 2/2006 Rebettge et al.
2009/0166534 A1* 7/2009 Collings ............. H01J 49/4225 250/282
2009/0294641 A1 12/2009 Konicek et al.
2009/0294663 A1 12/2009 Muntean et al.
2010/0301227 A1* 12/2010 Muntean ............... H01J 49/063 250/281
2010/0308218 A1 12/2010 Wang
2012/0126727 A1 5/2012 Hamm
2015/0364309 A1* 12/2015 Welkie .................. H01J 49/063 250/288
2021/0134575 A1 5/2021 Cheng et al.
2021/0151307 A1 5/2021 Guna

FOREIGN PATENT DOCUMENTS

WO 2011081188 A1 7/2011

OTHER PUBLICATIONS

International Search Report and Written Opinion in International Application PCT/IB2023/053018.
Xiaoyu Zhou et al: "Potential Distribution and Transmission Characteristics in a Curved Quadrupole Ion Guide", Journal of the American Society for Massspectrometry, vol. 22, No. 2, Jan. 19, 2011 (Jan. 19, 2011), pp. 386-398, XP055728775, us ISSN: 1044-0305, DOI: 10.1007/s13361-010-0045-0 figures 1,2.

* cited by examiner

*Primary Examiner* — David E Smith
*Assistant Examiner* — Hsien C Tsai
(74) *Attorney, Agent, or Firm* — ALG Intellectual Property, LLC

(57) ABSTRACT

It is proposed to improve transmission of ions along the curved path of an ion guide by changing the separation between adjacent multipole rods in the plane of curvature. As the separation increases along the length of the device, the ion confinement in the plane of curvature decreases. At the same time, the external field penetration from the electrodes outside of the main ion guide increases which can be used to create additional DC field gradients to facilitate ion confinement and motion through the ion guide.

32 Claims, 10 Drawing Sheets

ION GUIDE GEOMETRY IMPROVEMENTS

BACKGROUND

Technical Field

This disclosure generally relates to mass spectrometers and more specifically to curved ion guides for use in mass spectrometers.

Related Technology

The desire to design and build more compact smaller mass spectrometry systems drives the need to reduce the size of individual ion optics components. One of the well-known ways to make the ion beam path more compact is to bend the ion guides that are normally straight, whether by 90 degrees, 180 degrees or another angle. The other motivation to deviate from the straight guide geometry may come from the need for instrument robustness, such as when the neutral molecules and non-desolvated droplets are allowed to fly straight (and are discarded) while ions are guided in a different direction.

Examples of such ion guides in mass spectrometry systems include atmospheric pressure interface transfer optics, multipoles to transfer ions between different analyzer sections, HCD and CID collision cells, and some others.

Problems in the prior art include RF voltage necessitating bigger and more expensive power supplies. Additionally, higher voltage can create conditions within the ion guide that lead to instability of small ions, and, as an example, product ions that may be formed inside a collision cell. Too high RF voltage can also present transmission issues at the interface with other ion optics elements.

Several approaches have been suggested to alleviate these issues. According to U.S. Pat. No. 7,923,681B2, an additional straight section can be added to the front of the guide. If there is a certain background pressure in the guide, ions lose part of their energy in the straight section, so it is easier for them to follow the curved section. This method only works when sufficient collisional cooling is available, so ion guides with low pressure could not benefit from it.

In yet another approach, in US 2010/0301227 A1, an additional DC electric field is applied across the ion guide region at a magnitude that varies along the curved central axis, wherein the magnitude is at a maximum at the ion entrance and decreases along the curved central axis toward the ion exit. In this manner, the extra DC potential difference works against the centrifugal force to contain ions within the curve and tapers off towards the guide end where part of the ion energy is lost.

BRIEF SUMMARY

One embodiment of the present disclosure includes an ion guide having a curved path for use in a mass spectrometer. The ion guide can comprise an inner pair of electrodes extending along a length of the ion guide and forming an inner curvature of the curved path the ion guide; and an outer pair of electrodes extending along the length of the ion guide and forming an outer curvature of the curved path of the ion guide. The ion guide can be characterized in that the outer electrodes are configured such that the outer electrodes provide for a higher electric field gradient near the outer pair of electrodes greater than an electric field gradient near the inner pair of electrodes; and the inner pair of electrodes and the outer pair of electrodes are energized such that a resulting effective field gradient confines ions in the ion guide.

Another embodiment under the present disclosure includes an ion guide having a curved path for use in a mass spectrometer. The ion guide can comprise an inner pair of electrodes extending along a length of the ion guide and forming an inner curvature of the curved path of the ion guide; and an outer pair of electrodes extending along the length of the ion guide and forming an outer curvature of the curved path of the ion guide. The ion guide can be characterized in that at an entrance to the ion guide, the inner pair of electrodes are spaced apart from each other at a first distance, and the outer pair of electrodes are spaced apart from each other at a second distance and the first distance is greater than the second distance; and the inner pair of electrodes and the outer pair of electrodes are energized to create an effective field gradient that confines ions in the ion guide.

A further embodiment under the present disclosure can comprise a mass spectrometer. This spectrometer can comprise a power supply; and an ion guide having a curved path for use in a mass spectrometer. The ion guide can comprise an inner pair of electrodes extending along a length of the ion guide and forming an inner curvature of the curved path of the ion guide; and an outer pair of electrodes extending along the length of the ion guide and forming an outer curvature of the curved path of the ion guide. The ion guide can be characterized in that at an entrance to the ion guide, the inner pair of electrodes are spaced apart from each other at a first distance, and the outer pair of electrodes are spaced apart from each other at a second distance and the first distance is greater than the second distance; and the inner pair of electrodes and the outer pair of electrodes are energized to create an effective field gradient confines ions in the ion guide.

Another embodiment under the present disclosure can comprise a method of directing ions along an ion guide in a mass spectrometer. The method can comprise directing ions through an entrance of a curved path in the mass spectrometer, the curved path having an inner pair of electrodes that extend along the curved path and are separated from each other by a first distance, and having an outer pair of electrodes that extend along the curved path and are separated from each other at an entrance to the curved path by a second distance that is smaller than the first distance; and energizing the inner and outer pairs of electrodes to create an effective field gradient that confines ions in the ion guide.

Another embodiment under the present disclosure can comprise a method of directing ions along an ion guide in a mass spectrometer. The method can comprise directing ions through an entrance of a curved path in the mass spectrometer, the curved path having an inner pair of electrodes that extend along the curved path and are separated from each other by a first distance, and having an outer pair of electrodes that extend along the curved path and are configured to provide for a higher electric field gradient near the outer pair of electrodes greater than an electric field gradient near the inner pair of electrodes, and energizing the inner and outer pairs of electrodes to create an effective field gradient that confines ions in the ion guide.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

The foregoing has outlined rather broadly the features and technical advantages of the present invention in order that the detailed description of the invention that follows may be better understood. Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Figure 1:
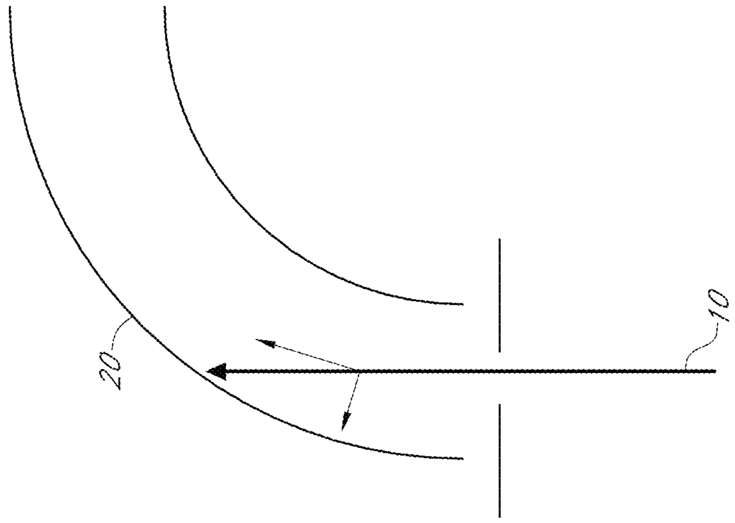
FIG. 1 illustrates an embodiment of an ion guide.

As discussed, curved ion guides can be useful in creating smaller mass spectrometry machines and systems. But curvature in the ion guide design may become a performance liability if care is not taken to ensure proper ion confinement. As it is shown in FIG. 1, as ions 10 travel along a curve 20, the centrifugal force tries to push them outside the confinement region. In order to prevent losses, the most straightforward approach is to increase the RF voltage on the guide elements. However, this may lead to the use of bigger and more expensive power supplies. Additionally, higher voltage can create conditions within the ion guide that lead to instability of small ions, and, as an example, product ions that may be formed inside a collision cell. Too high RF voltage can also present transmission issues at the interface with other ion optics elements.

While the prior art techniques can help improve ion transmission along a tight curve, they involve increase of the overall ion guide length and complexity, or the need for additional power supplies and electrodes. The present disclosure includes embodiments and proposals for new solutions that avoid some of the complexity. At the same time, when combined with certain additional arrangements, they also allow for the generation of effective electrical gradients to facilitate ion motion along the length of the ions guide.

Figure 2A:
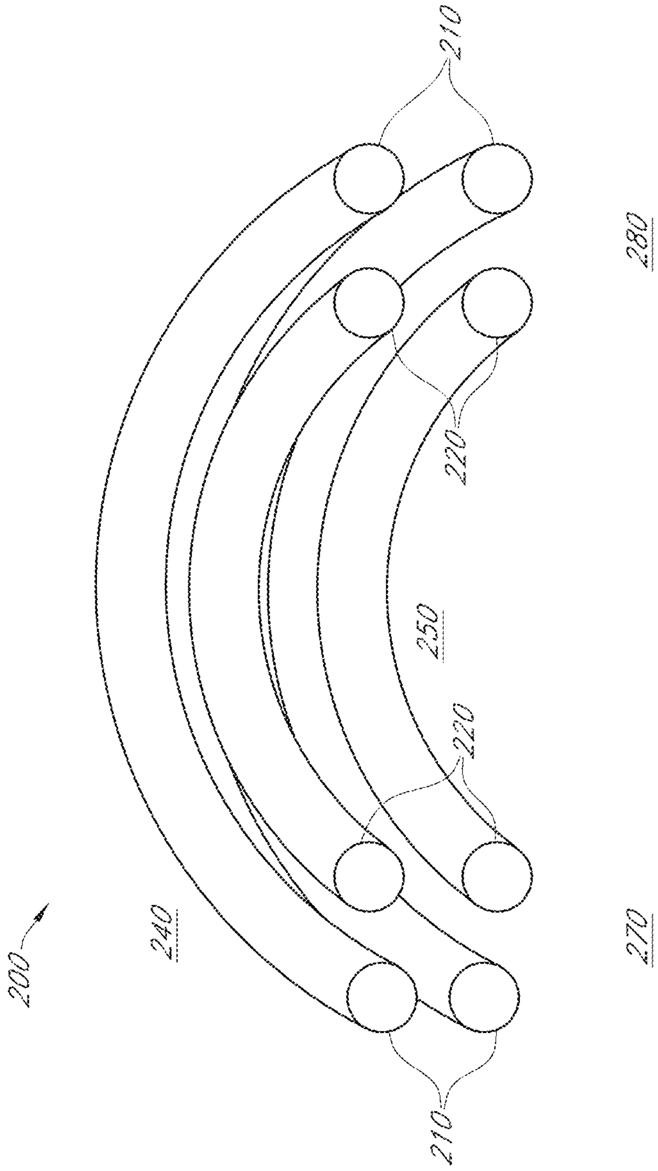
FIGS. 2A-2B show diagrams of an ion guide embodiment under the present disclosure.
Figure 2B:
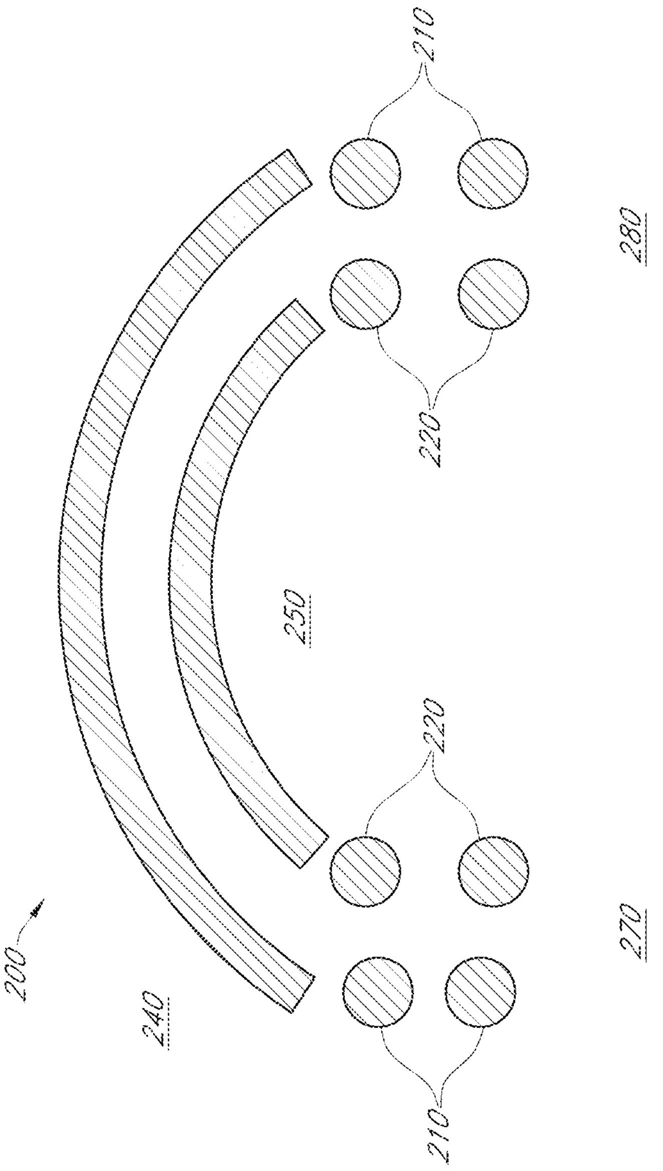

FIGS. 2A-2B illustrate one possible embodiment of the proposed invention. FIG. 2A shows a perspective view of outer electrodes 210 and inner electrodes 220 in a curved ion guide 200. Outer electrodes 210 are located within an outer wall 240 and inner electrodes 220 are located within an inner wall 250. FIGS. 2A and 2B illustrate the same embodiment, with equivalent component numbers. FIG. 2B differs from FIG. 2A by showing a common schematic model approach to representation of curved ion guides. Representations in the present disclosure can take either an pictographic or schematic model approach to illustrating embodiments. Curved ion guide 200 comprises an entrance 270 and exit 280. The circles represent the cross-section of ion guide electrodes or rods. In this case, there are four of them with each pair of opposing rods carrying the RF voltage of the same polarity to implement a quadrupole, though more rods may be included in the arrangement to implement other types of multipoles with more than four rods (e.g., hexapole, octopole, etc.). Electrodes 210 form an outer wall 240 of curved ion guide 200. Electrodes 220 form an inner wall 250. The total angle of curvature is shown to be 180 degrees, but other angles could be used. It can be seen that electrodes 210 are closer together than electrodes 220 at entrance 270. At exit 280, electrodes 210 are the same distance from each other (or within a reasonably small tolerance) as electrodes 220. The small distance between electrodes 210 at the entrance 270 creates a higher pseudopotential barrier and an effective field gradient for the ions with high kinetic energy and prevents ion loss due to centrifugal force moving around curved ion guide 200. As an ion is moving along the guide, it may lose kinetic energy due to collisions with background gas and there is less need for confining its motion in this direction.

Electrodes 210 are closer to each other at entrance 270 than at exit 280. Electrodes 210 can move further apart gradually along the length of curved ion guide 200. In alternative embodiments electrodes 210 can move in discontinuous steps. A side view of an electrode 210 of such an embodiment would resemble a staircase.

Figure 3:
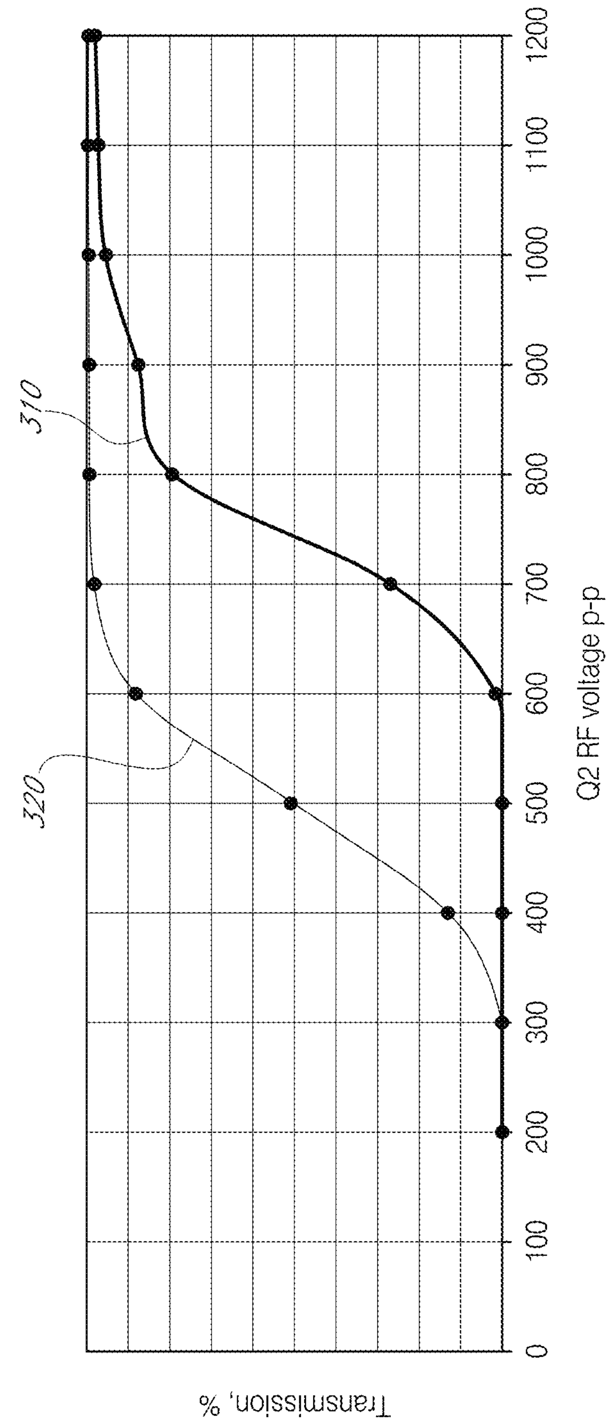
FIG. 3 shows a graph of transmission versus voltage for a mass spectrometer using embodiments under the present disclosure.

FIG. 3 shows a plot based on motion simulation results of two types of ion guide: a traditional guide geometry and a guide with an embodiment of the proposed modified geometry, such as described in relation to FIG. 2. Curve 310 shows the dependence of transmission of m/z 1522 ion vs. Q2 (or the second quadrupole used as the collision cell of a triple quadrupole mass spectrometer) RF voltage for the traditional geometry. Curve 320 represents the modified geometry. One can see that the voltage required for the transmission of ions in the second case is significantly lower (by about 30%). The actual change in geometry only reduces the effective field radius r0, of the ion guide by about 10%, so the RF field strength goes up linearly with r0 change.

Figure 4B:
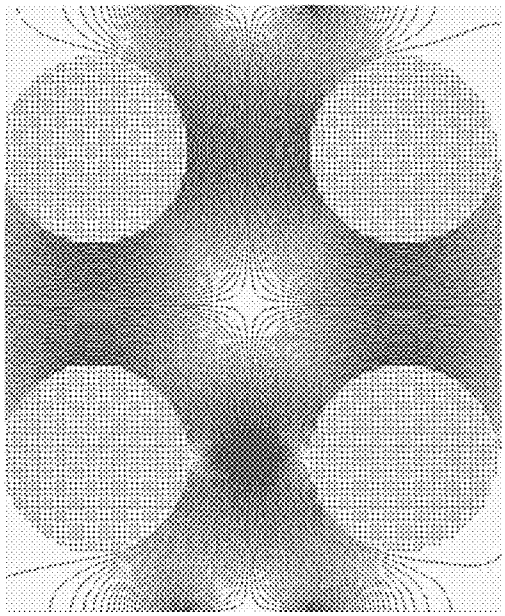
FIGS. 4A and 4B illustrate electric field lines using electrode embodiments under the current disclosure.
Figure 4A:
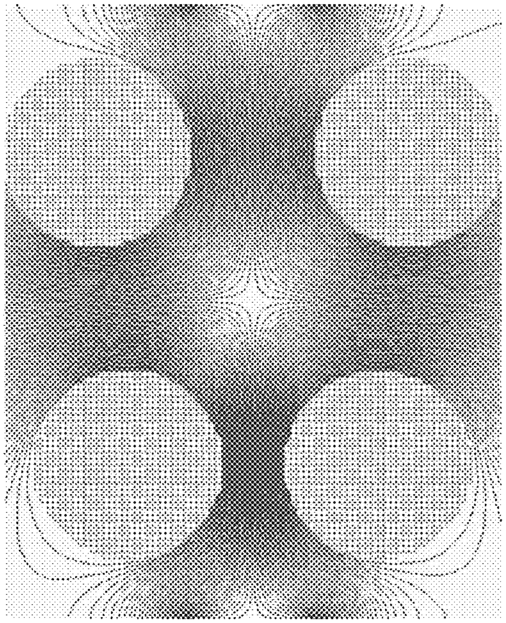

The effective containment of ions in the curved Q2 path is accomplished by the local RF field gradient near the two outer electrodes/rods (electrodes 210 of FIG. 2) that are disposed closer to each other, as described above. FIG. 4 shows the visual comparison of the RF field shape in the middle of the ion guide for the case a) under the modified geometry, and case b) the traditional geometry. One can see that in the case b) the symmetry is substantially maintained. Case b) can also show the approximate RF field shape of the exit 280 of the modified geometry shown in FIG. 2.

The simulation for the modified geometry suggests that the required reduction of RF voltage for smaller ions is 20% or less, which is in line with the r0 change. As a result, the ratio of highest and lowest simultaneously transmitted mass if is as good or better with the modified geometry design.

In some embodiments, extra can be taken to make sure that the improved containment of parent ions by the steeper RF gradient does not compromise the transmission of light product ions as they may become unstable at higher amplitudes. This can be important in a collision cell where there is a preference to simultaneously transmit both the parent ion and a selection of product ions. In an atmospheric pressure interface ion guide, one usually needs a broad range simultaneous transmission as well.

Another concern may arise from the fact that the modified electrode geometry is not symmetrical anymore, and neither is the RF field distribution. Asymmetries like that have been seen before to cause issues with resonances when the ion transmission gets strongly affected at certain voltages. Normally, in gas filled guides such resonances are smoothed out and do not cause problems. However, if such a resonance were indeed to cause an issue with the proposed rod shift, alternative embodiments under the present disclosure could further improve performance.

Figure 5C:
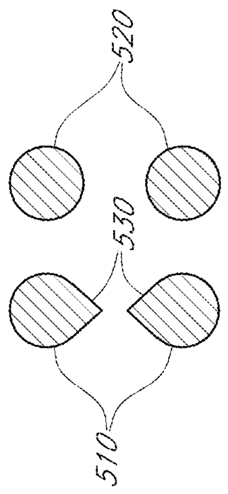
FIGS. 5A-5C illustrate electrode embodiments under the current disclosure.
Figure 5B:
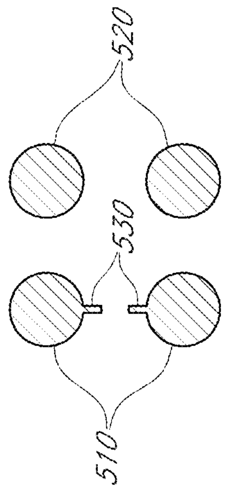
Figure 5A:
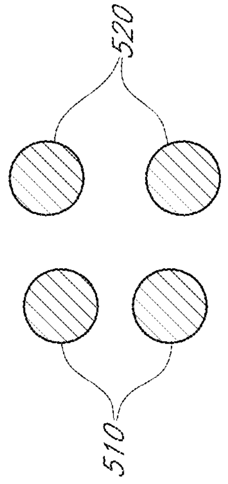

FIGS. 5A-5C show additional electrode or rod configuration embodiments under the present disclosure. FIG. 5A shows the shifted rods configuration of FIG. 2. FIGS. 5B and 5C show alternative geometries that still offer steeper field gradient near the two outer electrodes but maintain a more conventional shape of the electrode in the vicinity of the guide axis, so that the field is more symmetrical. In FIGS. 5B and 5C a large portion of the body of electrode 510 is symmetrical to electrodes 520. Extension 530 for both FIGS. 5B and 5C extends toward the other of electrode 510. Other extension shapes are possible. These alternative embodiments can offer some of the benefits of embodiments like FIG. 2, while mitigating some of the downsides of asymmetric potentials. The embodiments of FIGS. 5B and 5C can have the described shapes at an entrance to an ion guide and can optionally have a normal circular shape at an exit. The change from the shapes shown in FIGS. 5B and 5C to a normal circular shape can be gradual or can be "stepped" (the change can be discontinuous in having marked changes in shape until eventually reaching a circular shape).

Because of the electrode location or geometry changes on one side of the ion guide in some embodiments described herein, an optical axis of the ion guide is expected to shift by a small distance. This can be taken into account when designing the alignment features for the Q2 entrance lens(es) and any other optical elements upstream from the collision cell.

Figure 6:
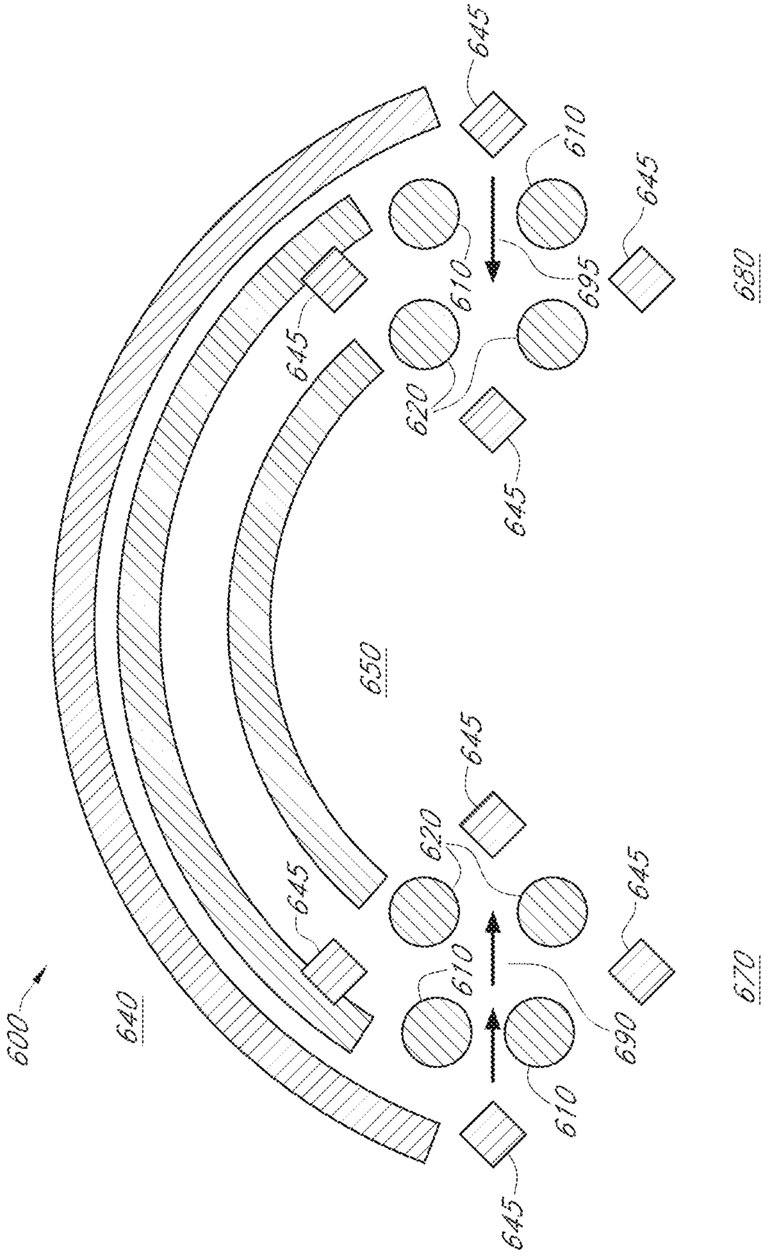
FIG. 6 shows a diagram of an ion guide embodiment under the present disclosure.

FIG. 6 shows another possible embodiment under the present disclosure. Another modified geometry can be used to create additional DC field potentials to keep ions within the ion guide and/or to push them along the length of the device. Curved ion guide 600 comprises an entrance 670 and an exit 680. At entrance 670, electrodes 610 are closer together than electrodes 620. Electrodes 610 comprise a portion of outer wall 640 while electrodes 620 comprise a portion of inner wall 650. The field potential created by electrodes 610 helps to direct ions around the curved ion guide 600 and keep them from escaping due to centrifugal force. DC electrodes 645 can be placed in between electrodes 610, 620 at entrance 670 and exit 680. DC electrodes 645 can form a portion of the walls 640, 650 within the curved ion guide 600. DC electrodes 645 can alternatively be buried in, or otherwise behind, the walls of curved ion guide 600. In such embodiments the DC electrodes can be acting from "behind" the electrodes 610, 620. In a preferred embodiment DC electrodes 645 are equidistant from each other along the curved ion guide 600. A different number of DC electrodes 645 can be used. A preferred embodiment is four DC electrodes—a quadrupole.

Often in RF guides used for transporting ions through gas filled sections of mass spectrometry systems additional electrodes (so-called drag vanes) are used for creating axial field gradient by using DC field penetration into the ion path. In our example of a quadrupole guide (DC electrodes 645), four such vanes can be arranged around the electrodes 610, 620 to balance field penetration from all direction. The electric potential on the vanes or the geometry can be varied along the length of the guide so that the field penetration changes, and an axial DC gradient is created inside the guide. Alternatively, the shape of DC electrodes 645 can be varied along the length of curved ion guide 600 to vary the DC field penetration.

In some embodiments, the effect from the additional DC electrodes 645 positioned outside electrodes 610, 620, varies due to changing distance between electrodes 610. Therefore, for example, if one DC electrode 645 is biased negatively with respect to the electrodes 610, 620, then there is a resulting negative gradient 695 along the guide axis which facilitates the motion of positive ions along the guide axis.

On the other hand, if the negative potential is also set higher on other three DC electrodes 645, then there is an additional DC field gradient 690 inside the guide that works to counteract the centrifugal force acting on ions as they enter the ion guide and try to follow the curve. This effect can further improve confinement of high m/z and reduce requirements for RF voltage.

Those skilled in the art will be able to expand the above approaches to ion guides with larger number of electrodes/rods/vanes with different geometries. For example, the electrode embodiments of FIGS. 5B and 5C can be combined with various DC electrode embodiments. Two, four or other numbers of DC electrodes can be used. Exact placement and/or shape of DC electrodes can be varied to achieve the desired DC field gradients.

Figure 7:
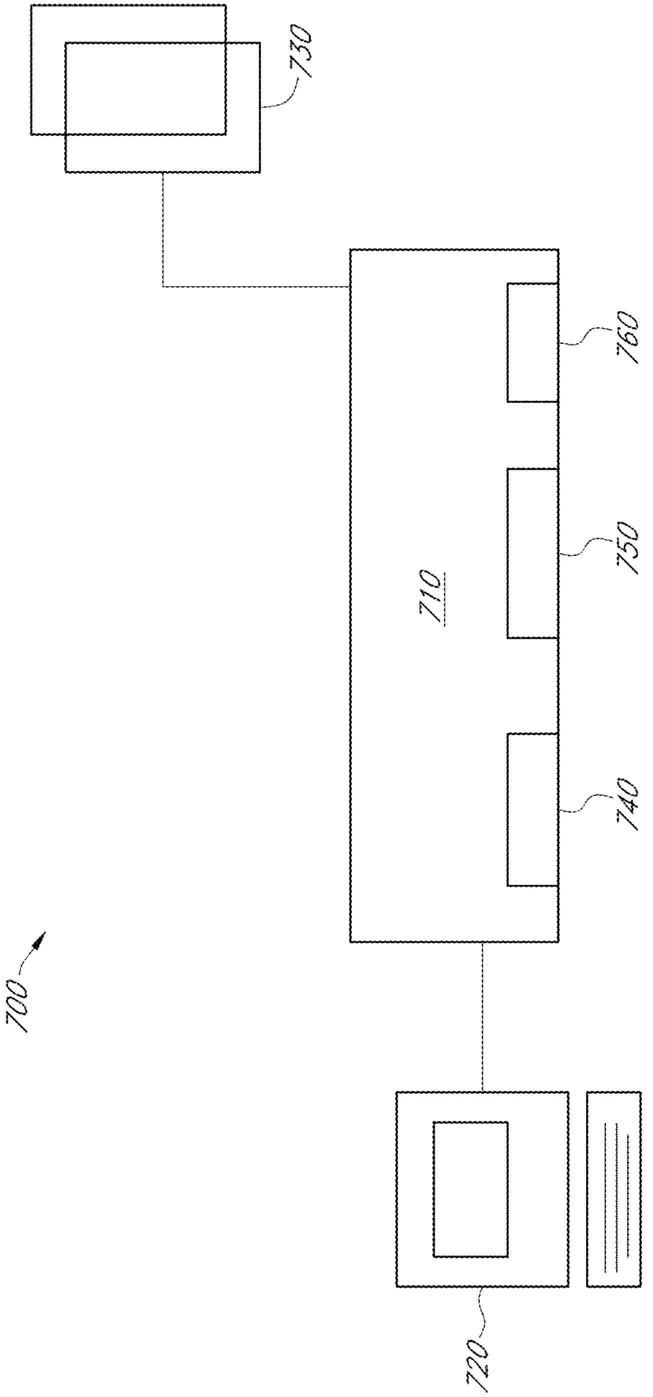
FIG. 7 shows a diagram of a mass spectrometer embodiment under the present disclosure.

FIG. 7 shows an embodiment of a mass spectrometer system 700 under the present disclosure. Mass spectrometer 710 can comprise a curved ion guide and electrodes, as described under the present disclosure. Mass spectrometer 710 can also comprise connections (or be integrated with) additional components, such as display 720 and computing devices 730. Computing devices 730 can comprise databases, servers, computers or other devices. Connections can be wired or wireless, such as over Bluetooth or Wi-Fi. Other components of mass spectrometer 710 can comprise a controller 740, memory 750, and power supply 760. Controller 740 and memory 750 can comprise computer-executable instructions or data structures and computer-readable media for executing the methods described herein and carrying out the typical functions of mass spectrometers 710 and mass spectrometer systems 700.

Figure 8:
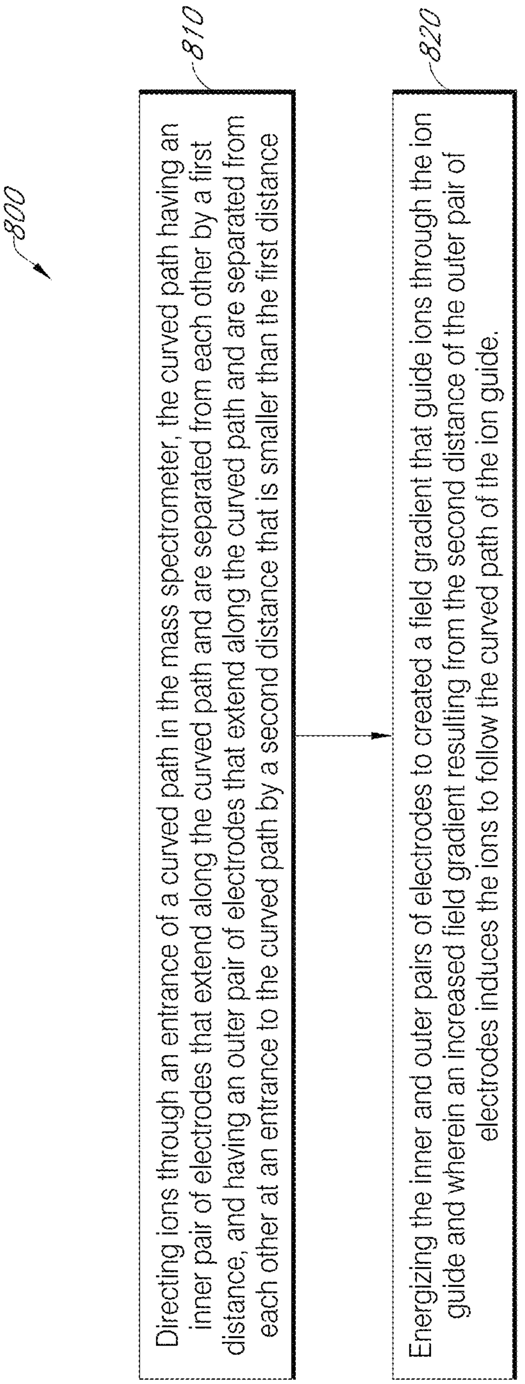
FIG. 8 shows a diagram of a method embodiment under the present disclosure.

FIG. 8 shows a possible method embodiment under the present disclosure. Method 800 comprises a method of directing ions along an ion guide in a mass spectrometer. Step 810 is directing ions through an entrance of a curved path in the mass spectrometer, the curved path having an inner pair of electrodes that extend along the curved path and are separated from each other by a first distance and having an outer pair of electrodes that extend along the curved path and are separated from each other at an entrance to the curved path by a second distance that is smaller than the first distance. Step 820 is energizing the inner and outer pairs of electrodes to create an effective field gradient that confines ions in the ion guide and wherein an increased field gradient resulting from the second distance of the outer pair of electrodes induces an axial force that causes the ions to follow the curved path of the ion guide.

Figure 9:
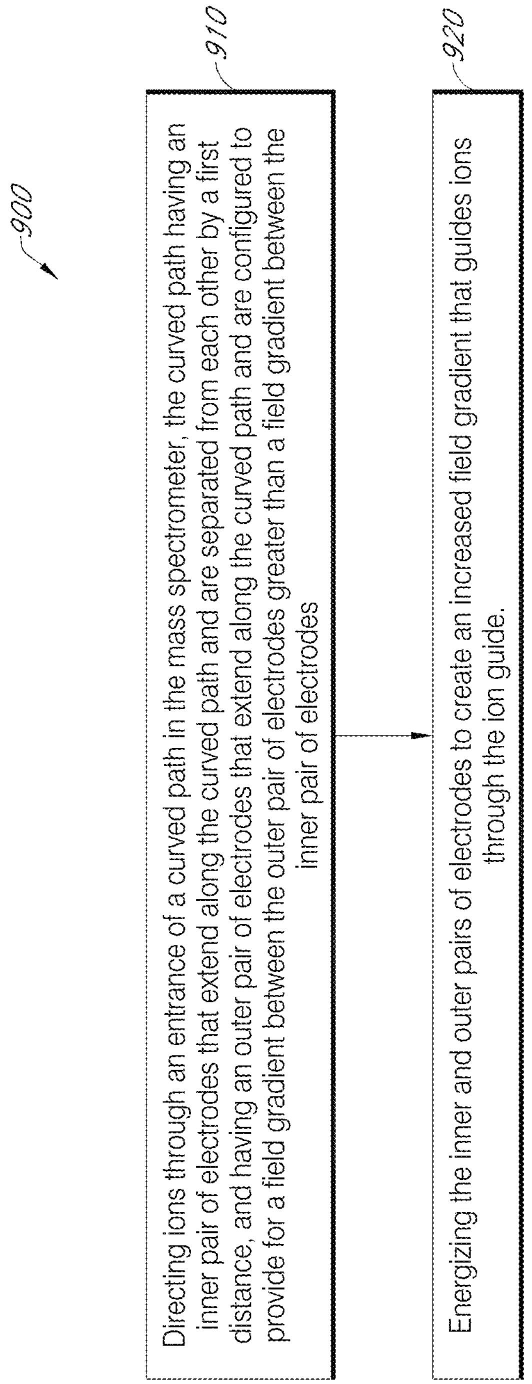
FIG. 9 shows a diagram of a method embodiment under the present disclosure.

FIG. 9 shows another possible method embodiment under the present disclosure. Method 900 comprises a method of directing ions along an ion guide in a mass spectrometer. Step 910 is directing ions through an entrance of a curved path in the mass spectrometer, the curved path having an inner pair of electrodes that extend along the curved path and are separated from each other by a first distance and having an outer pair of electrodes that extend along the curved path and are configured to provide for a field gradient near the outer pair of electrodes greater than a field gradient near the inner pair of electrodes. Step 920 is energizing the inner and outer pairs of electrodes to create an effective field gradient that guides ions through the ion guide.

Computer Systems of the Present Disclosure

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor circuit and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention.

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An ion guide having a curved path for use in a mass spectrometer, the ion guide comprising:
 an inner pair of electrodes extending along a length of the ion guide and forming an inner curvature of the curved path the ion guide; and
 an outer pair of electrodes extending along the length of the ion guide and forming an outer curvature of the curved path of the ion guide;
 wherein the inner electrodes and the outer electrodes are configured to create an effective field gradient between the outer pair of electrodes and the inner pair of electrodes when energized that confines the ion within the ion guide;
 wherein, at an entrance to the ion guide, the outer pair of electrodes are separated by a first distance smaller than a second distance separating the inner pair of electrodes.

2. The ion guide of claim 1, wherein, at an exit of the ion guide, the outer pair of electrodes are separated by a third distance equal to a fourth distance separating the inner pair electrodes.

3. The ion guide of claim 1, wherein the outer pair of electrodes each comprise an extension pointing towards each other.

4. The ion guide of claim 1, wherein the outer pair of electrodes each comprise a teardrop shape pointing towards each other.

5. The ion guide of claim 3, wherein the extensions become smaller between the entrance of the ion guide and an exit of the ion guide.

6. The ion guide of claim 1, wherein the outer pair of electrodes each comprise a teardrop shape at the entrance to the ion guide and each comprise a circular shape at an exit of the ion guide.

7. An ion guide having a curved path for use in a mass spectrometer, the ion guide comprising:
 an inner pair of electrodes extending along a length of the ion guide and forming an inner curvature of the curved path of the ion guide; and
 an outer pair of electrodes extending along the length of the ion guide and forming an outer curvature of the curved path of the ion guide;
 wherein, at an entrance to the ion guide, the inner pair of electrodes are spaced apart from each other at a first distance, and the outer pair of electrodes are spaced apart from each other at a second distance and the first distance is greater than the second distance; and
 further wherein, when energized, the outer pair of electrodes and the inner pair of electrodes create an effective field gradient between the outer pair of electrodes and the inner pair of electrodes that confines ions in the ion guide.

8. The ion guide of claim 7 wherein the distance between the outer pair of electrodes increases along the length of the ion guide such that the second distance is equal to the first distance at an exit of the ion guide.

9. The ion guide of claim 7 wherein the curved path is approximately 180 degrees.

10. The ion guide of claim 7 further comprising a plurality of DC electrodes, the plurality DC electrodes configured to extend along the curved path and to apply an axial field gradient to ions.

11. The ion guide of claim 10 wherein the plurality of DC electrodes are positioned between each of the inner and outer pairs of electrodes.

12. The ion guide of claim 10 wherein an electric potential on each of the plurality of DC electrodes is configured to vary along the curved path such as to vary a field penetration of the plurality of DC electrodes.

13. The ion guide of claim 10 wherein a shape of the plurality of DC electrodes varies along the curved path such as to vary a field penetration of the plurality of DC electrodes.

14. A mass spectrometer comprising:
 a power supply; and
 an ion guide having a curved path for use in a mass spectrometer, the ion guide comprising:
  an inner pair of electrodes extending along a length of the ion guide and forming an inner curvature of the curved path of the ion guide; and
  an outer pair of electrodes extending along the length of the ion guide and forming an outer curvature of the curved path of the ion guide;
 wherein, at an entrance to the ion guide, the inner pair of electrodes are spaced apart from each other at a first distance, and the outer pair of electrodes are spaced apart from each other at a second distance and the first distance is greater than the second distance; and
 further wherein, the inner pair of electrodes and the outer pair of electrodes are energized to create an effective field gradient that confines ions in the ion guide.

15. The mass spectrometer of claim 14 wherein the distance between the outer pair of electrodes increases along the length of the ion guide such that the second distance is equal to the first distance at an exit of the ion guide, and wherein the increase in distance between the outer pair of electrodes along the length of the ion guide creates an axial force that propels an ion down the ion guide.

16. The mass spectrometer of claim 14 wherein the curved path is approximately 180 degrees.

17. The mass spectrometer of claim 14 wherein the curved path is approximately 90 degrees.

18. The mass spectrometer of claim 14 further comprising a plurality of DC electrodes, the plurality of DC electrodes configured to extend along the curved path and to apply an axial field gradient to ions.

19. The mass spectrometer of claim 18 wherein the plurality of DC electrodes comprises four DC electrodes.

20. The mass spectrometer of claim 19 wherein the plurality of DC electrodes are positioned between each of the inner pair of electrodes and the outer pair of electrodes.

21. The mass spectrometer of claim 19 wherein an electric potential on each of the plurality of DC electrodes is configured to vary along the curved path such as to vary a field penetration of the plurality of DC electrodes.

22. The mass spectrometer of claim 19 wherein a shape of the plurality of DC electrodes varies along the curved path such as to vary a field penetration of the plurality of DC electrodes.

23. A method of directing ions along an ion guide in a mass spectrometer, comprising:
 directing ions through an entrance of a curved path in the mass spectrometer, the curved path having an inner pair of electrodes that extend along the curved path and are separated from each other by a first distance, and having an outer pair of electrodes that extend along the curved path and are separated from each other at an entrance to the curved path by a second distance that is smaller than the first distance; and energizing the inner and outer pairs of electrodes to create an effective field gradient that confines ions in the ion guide.

24. The method of claim 23 wherein the second distance between the outer pair of electrodes increases along the curved path of the ion guide such that the second distance is equal to the first distance at an exit of the ion guide, and wherein the increase in distance between the outer pair of electrodes along the curved path of the ion guide creates and axial force that propels the ions down the ion guide.

25. The method of claim 23 further comprising providing a plurality of DC electrodes along the curved path, the plurality of DC electrodes configured to apply an axial field gradient to the ions as they travel the curved path.

26. The method of claim 24 wherein the distance between the outer pair of electrodes moves discontinuously from the second distance to the first distance.

27. The method of claim 24 wherein the distance between the outer pair of electrodes moves continuously from the second distance to the first distance.

28. A method of directing ions along an ion guide in a mass spectrometer, comprising:

directing ions through an entrance of a curved path in the mass spectrometer, the curved path having an inner pair of electrodes that extend along the curved path and are separated from each other by a first distance, and having an outer pair of electrodes that extend along the curved path and are configured to provide for a field gradient near the outer pair of electrodes greater than a field gradient near the inner pair of electrodes; and energizing the inner and outer pairs of electrodes to create an effective field gradient that confines ions in the ion guide.

29. The method of claim 28 wherein the outer pair of electrodes are separated by a second distance smaller than the first distance.

30. The method of claim 28, wherein the outer pair of electrodes each comprise an extension pointing towards each other.

31. The method of claim 28, wherein the outer pair of electrodes each comprise a teardrop shape pointing towards each other.

32. The method of claim 30, wherein the extensions become smaller between an entrance and an exit of the ion guide.

* * * * *